United States Patent [19]

Oppenländer

[11] Patent Number: 4,807,960
[45] Date of Patent: Feb. 28, 1989

[54] DEVICE FOR PAIR-WISE COUPLING THE ENDS OF TWO GROUPS OF OPTICAL FIBERS

[75] Inventor: Theodor Oppenländer, Cologne, Fed. Rep. of Germany

[73] Assignee: U.S. Philips Corp., New York, N.Y.

[21] Appl. No.: 212,813

[22] Filed: Jun. 29, 1988

Related U.S. Application Data

[63] Continuation of Ser. No. 40,464, Apr. 20, 1987.

[30] Foreign Application Priority Data

Apr. 19, 1986 [DE] Fed. Rep. of Germany ....... 3613345

[51] Int. Cl.$^4$ .............................................. G02B 6/40
[52] U.S. Cl. .................... 350/96.22; 350/96.20; 350/96.21; 350/96.15
[58] Field of Search ............... 350/96.10, 96.15, 96.20, 350/96.21, 96.22, 96.24

[56] References Cited

U.S. PATENT DOCUMENTS

| | | | |
|---|---|---|---|
| 3,960,531 | 6/1976 | Kohanzadeh et al. | 350/96.21 |
| 4,047,283 | 9/1977 | Kunze | 350/96.21 |
| 4,062,620 | 12/1977 | Pirolli | 350/96.20 |
| 4,135,783 | 1/1979 | Kunze | 350/96.21 |
| 4,146,301 | 3/1979 | Cherin et al. | 350/96.21 |
| 4,274,707 | 6/1981 | Pacey et al. | 350/96.20 |
| 4,279,468 | 7/1981 | Turley | 350/96.21 |
| 4,281,892 | 8/1981 | Sitabkhan | 350/96.21 |
| 4,313,744 | 2/1982 | Toda | 350/96.21 |
| 4,345,137 | 8/1982 | Mignien et al. | 350/96.21 |
| 4,377,323 | 3/1983 | Schneider | 350/96.21 |
| 4,379,771 | 4/1983 | Snyder | 350/96.20 |
| 4,512,627 | 4/1985 | Archer et al. | 350/96.20 |
| 4,548,630 | 10/1985 | Biedka | 350/96.21 |
| 4,556,282 | 12/1985 | Delebecque | 350/96.21 |
| 4,636,032 | 1/1987 | Grego | 350/96.20 |
| 4,657,341 | 4/1987 | Sammueller | 350/96.22 |
| 4,662,713 | 5/1987 | Davies et al. | 350/96.21 |
| 4,744,629 | 5/1988 | Bertoglio et al. | 350/96.20 |
| 4,749,253 | 6/1988 | Dean et al. | 350/96.21 |
| 4,750,804 | 6/1988 | Osaka et al. | 350/96.21 |
| 4,753,515 | 6/1988 | Sato et al. | 350/96.22 X |
| 4,755,018 | 7/1988 | Heng et al. | 350/96.21 |
| 4,765,709 | 8/1988 | Suillerot et al. | 350/96.20 |

FOREIGN PATENT DOCUMENTS

| | | | |
|---|---|---|---|
| 53-27043 | 3/1978 | Japan | 350/96.21 |
| 53-88738 | 8/1978 | Japan | 350/96.20 |
| 54-34845 | 3/1979 | Japan | 350/96.22 |
| 55-96912 | 7/1980 | Japan | 350/96.21 |
| 55-110210 | 8/1980 | Japan | 350/96.22 |
| 58-113006 | 9/1980 | Japan | 350/96.21 |
| 56-57016 | 5/1981 | Japan | 350/96.20 |
| 58-2815 | 1/1983 | Japan | 350/96.21 |
| 58-49907 | 3/1983 | Japan | 350/96.20 |
| 60-48006 | 3/1985 | Japan | 350/96.21 |
| 61-167908 | 7/1986 | Japan | 350/96.21 |
| 2000320 | 1/1979 | United Kingdom | 350/96.21 |
| 1570032 | 6/1980 | United Kingdom | 350/96.21 X |

OTHER PUBLICATIONS

Journal of Lightwave Technology, vol. Lt.-2, No. 1, 1984.

Primary Examiner—William L. Sikes
Assistant Examiner—Brian M. Healy
Attorney, Agent, or Firm—William L. Botjer

[57] ABSTRACT

The invention relates to a device for pair-wise coupling the ends of two groups of optical fibres which are retained by means of clamping devices on respective slides which are displaceable essentially in the longitudinal direction of the optical fibres so that the end faces of one group of optical fibres can be positioned against the end faces of the other group of optical fibres; the device comprises an alignment block which is arranged between the slide and which comprises guide grooves for the alignment of the individual optical fibres in which the ends of the optical fibres, inserted in associated fan-out combs, are arranged and retained by pressure members which exert different forces. A high positioning accuracy is simply obtained in that for each group of optical fibres there is provided a pressure member (18, 19) which exerts a weight-dependent pressure on the optical fibres via a contact member (25, 26), on each pressure member there being provided a magnetic armature (23, 24) which is situated within the range of influence of a permanent magnet (27) which is displaceable, essentially against the force of gravity, towards the magnetic armatures (23, 24) of the pressure members (18, 19), thus increasing said weight-dependent pressure.

8 Claims, 1 Drawing Sheet

DEVICE FOR PAIR-WISE COUPLING THE ENDS OF TWO GROUPS OF OPTICAL FIBERS

This is a continuation of application Ser. No. 040,464, filed Apr. 20, 1987.

BACKGROUND OF THE INVENTION

The invention relates to a device for pair-wise coupling the ends of two groups of optical fibres which are retained by means of clamping devices on respective slides which are displaceable essentially in the longitudinal direction of the optical fibres so that the end faces of one group of optical fibres can be positioned against the end faces of the other group of optical fibres, which device comprises an alignment block which is arranged between the slides and which comprises guide grooves for the alignment of the individual optical fibres in which the ends of the optical fibres, inserted in associated fan-out combs, are arranged and retained by pressure members which exert different forces.

Devices of this kind are described, for example in Journal of Lightwave Technology, Vol. Lt.-2, No. 1, 1984, page 28, and are used for the alignment of pairs of optical fibres to be spliced. However, they are also suitable for temporarily coupling the optical fibres in order to form a low-attenuation optical connection, for example for performing measurements.

In the known device, for each group of optical fibres low-force pressure members are arranged on the alignment block so as to preceed the connection area, and high-force pressure members are arranged on the slides. The low-force pressure members serve to prevent lateral excursions of the fibres from the guide grooves, but still allows for axial displacement in the direction of the guide groove.

However, in the guide grooves of the slides the fibres are retained so as to be immobile also in the longitudinal direction.

SUMMARY OF THE INVENTION

It is an object of the invention to simplify the known device and to improve its positioning accuracy.

The device according to the invention is characterized in that for each group of optical fibres there is provided a pressure member which exerts a weight-dependent pressure on the optical fibres via a contact member, on each pressure member there being provided a magnetic armature which is situated within the range of influence of a permanent magnet which is displaceable, essentially against the force of gravity, towards the magnetic armature of the pressure member, thus increasing said weight-dependent pressure.

Because each pressure member in accordance with the invention produces a low as well as a high force, the overall length of the guide grooves can be reduced. Moreover, after the alignment the ends of the optical fibres are firmly pressed in the direct vicinity of the area of abutment, so that a correct alignment of the individual fibres with respect to one another is ensured. The high forces are now gradually applied to the fibres when the permanent magnet is displaced, so that the risk of fibre fractures upon activation of the high-force pressure members is eliminated.

Furthermore, permanent magnets enable precise adjustment of the air gap between the permanent magnet and the associated armature by simple means, thus enabling exact dosing of the force.

In order to ensure that the force is distributed as uniformly as possible over all optical fibres of a group, the pressure member is pivotably connected to a lever in a preferred embodiment in accordance with the invention.

In a further preferred embodiment of the device according to the invention the insertion of the individual optical fibres of a group into the guide grooves via the fan-out combs is facilitated in that the fan-out combs are parts of the alignment block which are associated with the guide grooves, said fan-out combs being arranged directly in front of the guide grooves.

In order to prevent accidental contact between the ends of the optical fibres of an already inserted group and the optical fibres of the other group when the latter are inserted, which is liable to damage notably the end faces of the optical fibres to be connected, a particularly attractive embodiment in accordance with the invention includes a hold-up member which can be retracted from the area of the optical fibres and which is arranged over the guide grooves between one of the fan-out combs and the area of connection of the groups of optical fibres.

BRIEF DESCRIPTION OF THE DRAWINGS

The invention will be described in detail hereinafter with reference to the accompanying diagrammatic drawing.

DETAILED DESCRIPTION OF THE INVENTION

Figures 1, 2:
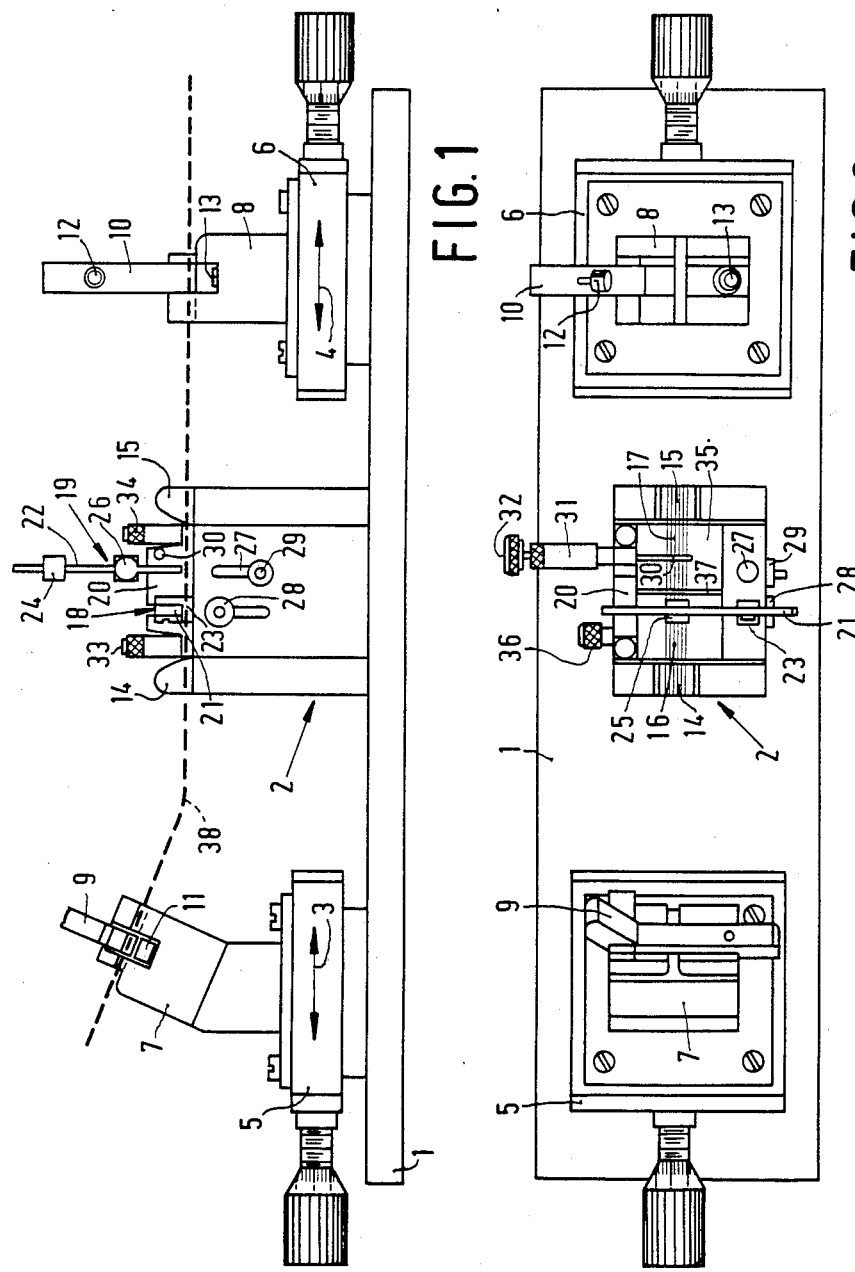
FIG. 1 is a longitudinal sectional view of a device in accordance with the invention for the temporary pair-wise coupling of the individual optical fibres of two optical fibre ribbons.
FIG. 2 is a plan view of the device shown in FIG. 1.

The device shown in the FIGS. 1 and 2 serves notably for coupling the individual optical fibres of two optical fibre ribbon in order to achieve an optical coupling in which the attentuation is as low as possible. An optical fibre ribbon comprises a plurality of optical fibres which are rigidly interconnected in a flat plane with a constant spacing. In order to enable connections to be made between the individual optical fibres of a fibre ribbon and the individual optical fibres of another fibre ribbon, the individual optical fibres must first be separated from one another over a given length. Furthermore, the protective jacket must be removed from the end portions of the optical fibres. Groups of optical fibres of two fibre ribbons thus treated are aligned with respect to one another by means of the device shown in the Figures their end faces being pair-wise positioned one against the other.

On a base plate 1 there is mounted an alignment block 2. On both sides of this block there are arranged slides 5 and 6 which are displaceable in the direction of the double arrows 3 and 4, respectively, for the displacement of retaining blocks 7 and 8, respectively, on which the end portions of two fibre ribbons to be connected can be secured by means of clamping levers 9 and 10. Adjustable ferro-magnetic armatures 11 and 12 are secured to the clamping levers 9 and 10, respectively, said armatures being attracted by magnets 13 shown at the right in FIG. 2.

On the alignment block 2 there are arranged fan-out combs 14 and 15 which comprise a number of deep slits which corresponds to the number of optical fibres of the fibre ribbon and in which the optical fibres can be inserted at the desired distance from another. The rounded and sloping contour of the combs 14 and 15 shown in FIG. 1 facilitates the insertion of the optical fibres.

The slits of the combs 14 and 15 are directly succeeded by parallel extending guide grooves 16 and 17 which are aligned with respect thereto and which preferably have a triangular cross-section.

The two groups of optical fibres to be connected can be located in the guide grooves 16 and 17 of the alignment block 2 by means of pressure members 18 and 19. Each pressure member consists of a lever 21, 22, respectively, which is pivotably arranged in a bearing block 20, a magnetic armature 23, 24, respectively, being secured to the end portions of said levers. At their centre portion contact members 25, 26, respectively, are pivotable arranged so that their contact surface which is preferably made of a plastics which is not excessively hard, uniformly presses down all optical fibres.

A low pressure which allows for displacement of the optical fibres in the longitudinal direction results from the weight of the pressure members 18 and 19 which can be pivoted from the position shown for the member 19 to the position shown for the member 18.

The pressure can be increased by displacement in the longitudinal direction of magnets 27, guided in the alignment block 2, towards the armatures 23, 24, respectively. Actuation knob 28 of the magnet (not shown) associated with the armature 23 occupies the upper position for exerting a high pressure. Actuation knob 29 of the magnet 27, however, is set to the lower position in which almost no additional pressure is produced by the magnet 27.

A hold-up pin 30 is arranged over the guide groove 17. It is guided in a sleeve 31 which is connected to the bearing block 20 and can be retracted by means of a knob 32. Its function will be described in detail hereinafter.

The bearing block 20 is secured to the alignment block 2 by means of hand-screws 33 and 34, so that it can be readily removed for cleaning purposes, together with the elements connected thereto. The hard metal block 35 in which the guide grooves 16 and 17 are formed can also be removed for cleaning after loosening of the clamping screws 36.

First, the portions of the separated optical fibres which adjoin the solid fibre ribbon are inserted into the comb 14. They are also automatically inserted into the guide grooves 16. Subsequently, the end of the fibre ribbon is retracted by hand, so that the optical fibres smoothly slide underneath the lightly pressing pressure member 18 until the ends of the optical fibre are situated at the area of the slit 37 in the hard metal block 35. Subsequently, the fibre ribbon is clamped onto the retaining block 7 by means of the clamping lever 9.

Subsequently, the optical fibres of the other fibre ribbon are inserted into the comb 15 in the same way; initially they rest on the hold-up pin 30 so that they cannot contact the already inserted optical fibres of the other fibre ribbon in an uncontrolled and hence possibly damaging way. After that, the fibre ribbon is retracted so far that the optical fibres of the two groups can no longer contact one another. The hold-up pin is subsequently retracted and the optical fibres drop down into the guide grooves 17. The pressure member 19 is then loosely pressed down and the clamping lever 10 is firmly pressed down. Subsequently, the slides 5 and 6 are moved towards one another until all end faces of the optical fibres of the two fibre ribbons pairwise abutt, length differences between the individual optical fibres being compensated for in that a different arcuation can occur, notably in the curved area 38. Finally, the actuation knobs 28 and 29 are moved upwards, so that the pressures of the pressure members 21 and 22 are increased to such an extent that longitudinal displacement of the optical fibres in the guide grooves 16 and 17 is no longer possible.

The invention has been described with reference to a device which is suitable for the temporary coupling of optical fibres. However, it will be simply possible to extend this device with appropriate elements enabling subsequent splicing of the pairs of optical fibres.

What is claimed is:

1. A device for pair-wise coupling the ends of two groups of optical fibres which are retained by means of clamping devices on respective slides which are displaceable essentially in the longitudinal direction of the optical fibres so that the end faces of one group of optical fibres can be positioned against the end faces of the other group of optical fibres, which device comprises an alignment block which is arranged between the slides and which comprises guide grooves for the alignment of the individual optical fibres in which the ends of the optical fibres, inserted in associated fan-out combs, are arranged and retained by pressure members which exert different forces, characterized in that for each group of optical fibres there is provided a pressure member (18, 19) which exerts a weight-dependent pressure on the optical fibres via a contact member (25, 26), on each pressure member (18, 19) there being provided a magnetic armature (23, 24) which is situated within the range of influence of a permanent magnet (27) which is displaceable essentially against the force of gravity, towards the magnetic armature (23, 24) of the pressure members (18, 19), thus increasing said weight-dependent pressure.

2. A device as claimed in claim 1, characterized in that the contact members (25, 26) are pivotably connected to pivot levers (21,22).

3. A device as claimed in claims 1 or 2, characterized in that the fan-out combs (14, 15) are parts of the alignment block (2) which are associated with the guide grooves (16, 17), said fan-out combs being arranged directly in front of the guide grooves (16,17).

4. A device as claimed in claims 1 or 2, characterized in that between one of the fan-out combs (15) and the area of connection of the groups of optical fibres (slit 37) and over the guide grooves (17) there is arranged a hold-up member (30) which can be retracted from the area of the optical fibres.

5. A coupling device for first and second groups of optical fibers comprising:
first and second clamping devices, said first and second clamping devices being displaceable along the longitudinal axis of the optical fibers to permit the positioning of the end faces of said first group of optical fibers against the end faces of said second group of optical fibers;
an alignment block disposed between said first and second clamping devices, said alignment block including first and second guide grooves for receiving the individual fibers of said first and second groups of optical fibers;
first and second pressure members mounted to said alignment block for exerting pressure on said first and second groups of optical fibers, each of said pressure members including magnetic means for magnetic engagement with displaceable magnetic means disposed on said alignment block, said displaceable magnetic means being displaceable towards said magnetic means of said pressure member to increase the pressure on said optical fibers when said magnetic means on said alignment block are displaced towards said magnetic means on said pressure members.

6. The device as claimed in claim 5 wherein said pressure members include contact members for engagement with said optical fibers and are pivotally mounted to said alignment block.

7. The device as claimed in claim 5 wherein said alignment block further includes fan-out combs spreading said optical fibers in a transverse direction, said fan-out combs being arranged in front of said guide grooves.

8. The device as claimed in claim 7 further including a hold-up member disposed between said guide grooves and said fan-out combs, said hold-up member being displaceable from a first position in engagement with said optical fibers to a second position out of engagement with said optical fibers.

* * * * *